United States Patent Office.

WILLIAM JESSE MILLER, OF LINESVILLE, PENNSYLVANIA.

Letters Patent No. 61,631, dated January 29, 1867.

IMPROVED MEDICINE.

The Schedule referred to in these Letters Patent and making part of the same.

TO ALL WHOM IT MAY CONCERN:

Be it known that I, WILLIAM JESSE MILLER, of Linesville, in the county of Crawford, State of Pennsylvania, have produced and invented a new Composition of Medicine for the cure of rheumatism; and I do hereby declare that the following is a full and exact description of the same.

1. One ounce of columbo root.
2. One ounce of burdock seed or root.
3. One ounce of mustard seed.
4. One ounce of sulphur.
5. One ounce of white-pine pitch.
6. One ounce of elecampane root.

The above ingredients are to be put in one pint of brandy.

What I claim as my invention, and desire to secure by Letters Patent of the United States, is—

The above-described composition of matter, for the purposes set forth.

WILLIAM JESSE MILLER.

Witnesses:
   A. B. RICHMOND,
   A. A. LORD.